(12) United States Patent
Yadav et al.

(10) Patent No.: US 12,173,616 B2
(45) Date of Patent: Dec. 24, 2024

(54) METHODS AND APPARATUS FOR PASSIVE FAN BLADE TIP CLEARANCE CONTROL

(71) Applicant: General Electric Company, Schenectady, NY (US)

(72) Inventors: Abhijeet Yadav, Bengaluru (IN); Kishore Budumuru, Bengaluru (IN); Nitesh Jain, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/154,556

(22) Filed: Jan. 13, 2023

(65) Prior Publication Data

US 2024/0141790 A1 May 2, 2024

(30) Foreign Application Priority Data

Nov. 2, 2022 (IN) .............................. 202211062690

(51) Int. Cl.
*F01D 5/14* (2006.01)
*F01D 5/28* (2006.01)
*F02C 7/20* (2006.01)

(52) U.S. Cl.
CPC ............ *F01D 5/147* (2013.01); *F01D 5/286* (2013.01); *F02C 7/20* (2013.01); *F05D 2240/307* (2013.01); *F05D 2300/17* (2013.01); *F05D 2300/505* (2013.01)

(58) Field of Classification Search
CPC . F01D 5/147; F01D 5/286; F02C 7/20; F05D 2240/307; F05D 2300/17; F05D 2300/505
See application file for complete search history.

(56) References Cited

U.S. PATENT DOCUMENTS

| | | | |
|---|---|---|---|
| 3,846,041 A | 11/1974 | Albani | |
| 5,344,284 A | 9/1994 | Delvaux et al. | |
| 6,966,755 B2 | 11/2005 | Garner | |
| 7,549,841 B1 | 6/2009 | Marussich | |
| 8,366,392 B1 | 2/2013 | Liang | |
| 9,670,786 B2 | 6/2017 | Read et al. | |
| 9,752,441 B2 | 9/2017 | Hildebrand et al. | |
| 10,408,067 B2 | 9/2019 | Marin | |
| 2005/0175447 A1 | 8/2005 | Garner | |
| 2015/0192029 A1 | 7/2015 | Roberts, III et al. | |
| 2016/0003057 A1 | 1/2016 | Read et al. | |
| 2021/0172339 A1* | 6/2021 | Freeman | F01D 25/246 |

FOREIGN PATENT DOCUMENTS

EP 3992433 A1 * 5/2022 ............. F01D 5/141

* cited by examiner

*Primary Examiner* — Grant Moubry
*Assistant Examiner* — Ruben Picon-Feliciano
(74) *Attorney, Agent, or Firm* — Hanley, Flight & Zimmerman, LLC

(57) ABSTRACT

Methods, apparatus, systems, and articles of manufacture are disclosed for passive fan blade tip clearance control. A fan blade for a gas turbine engine, the fan blade comprising a fan blade body including a tip region at a blade tip of the fan blade body and a blade tip insert disposed within the tip region of the fan blade body, the blade tip insert is formed from a material that passively adjusts a shape of the blade tip insert to maintain a blade tip clearance between the blade tip and an engine casing or nacelle by at least one of expanding or contracting based on temperature.

20 Claims, 9 Drawing Sheets

METHODS AND APPARATUS FOR PASSIVE FAN BLADE TIP CLEARANCE CONTROL

RELATED APPLICATION

This patent claims the benefit of Indian Provisional Patent Application No. 202211062690, which was filed on Nov. 2, 2022. Indian Provisional Patent Application No. 202211062690 is hereby incorporated herein by reference in its entirety. Priority to Indian Provisional Patent Application No. 202211062690 is hereby claimed.

FIELD OF THE DISCLOSURE

This disclosure relates generally to turbine gas engines and, more particularly, to turbine gas engine fan blades.

BACKGROUND

A turbine engine, also referred to herein as a gas turbine engine, is a type of internal combustion engine that uses atmospheric air as a moving fluid. A turbine engine generally includes a fan and a core arranged in flow communication with one another. As atmospheric air enters the turbine engine, rotating blades of the fan and the core impel the air downstream, where the air is compressed, mixed with fuel, ignited, and exhausted. Typically, at least one casing or housing surrounds the turbine engine.

Figure 1:
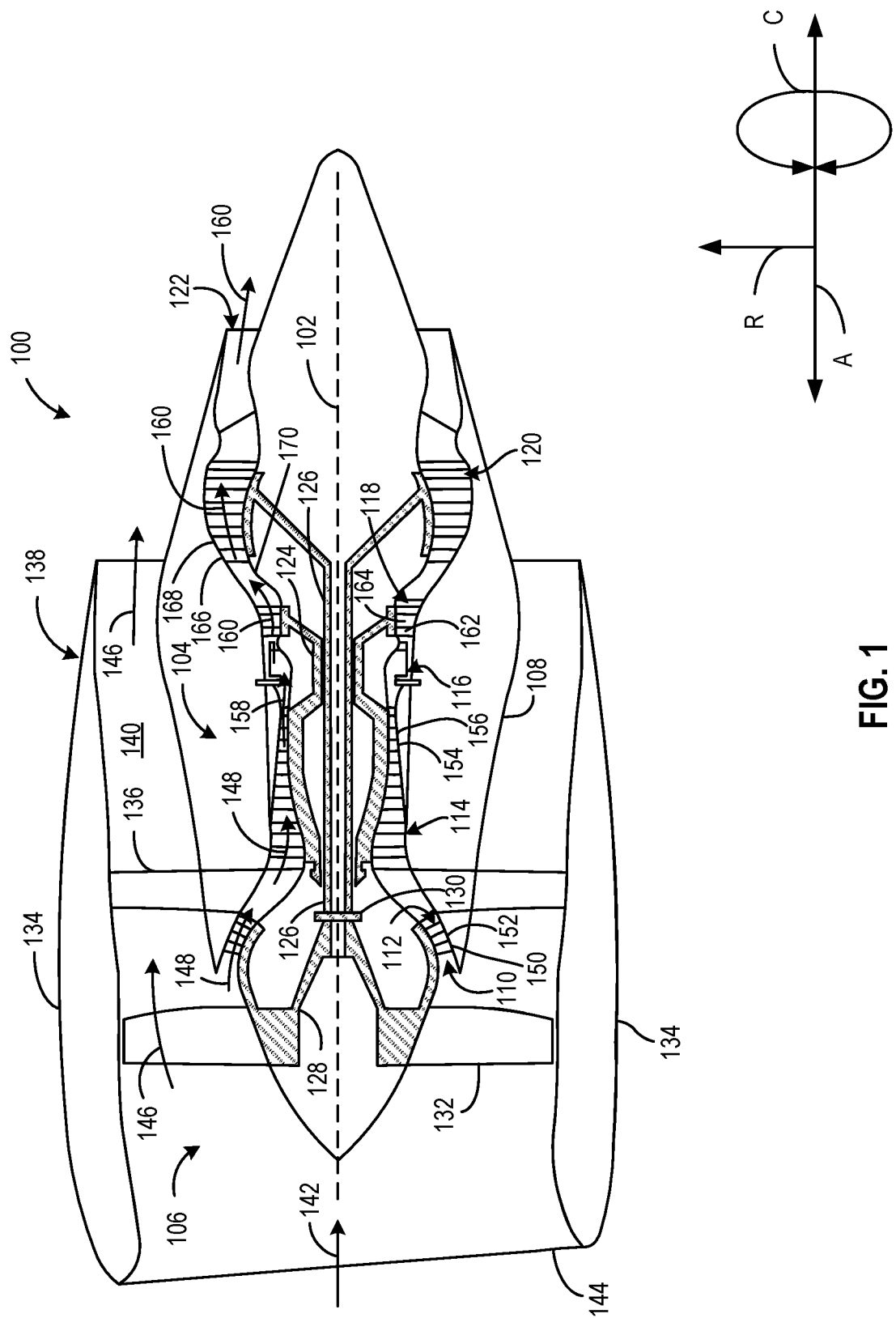
FIG. 1 is a cross-sectional view of an example gas turbine engine in which examples disclosed herein may be implemented.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second. In some examples used herein, the term "substantially" is used to describe a relationship between two parts that is within three degrees of the stated relationship (e.g., a substantially same relationship is within three degrees of being the same, a substantially flush relationship is within three degrees of being flush, etc.). In some examples used herein, the term "substantially" is used to describe a value that is within 10% of the stated value.

The terms "upstream" and "downstream" refer to the relative direction with respect to fluid flow in a fluid pathway. For example, "upstream" refers to the direction from which the fluid flows, and "downstream" refers to the direction to which the fluid flows. The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

Various terms are used herein to describe the orientation of features. In general, the attached figures are annotated with reference to the axial direction, radial direction, and circumferential direction of the vehicle associated with the features, forces and moments. In general, the attached figures are annotated with a set of axes including the axial axis A, the radial axis R, and the circumferential axis C.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

DETAILED DESCRIPTION

Turbine engines are some of the most widely-used power generating technologies, often being utilized in aircraft and power-generation applications, for example. A turbine engine generally includes a fan positioned forward of a core, which includes, in serial flow order, a compressor section (e.g., including one or more compressors), a combustion section, a turbine section (e.g., including one or more turbines), and an exhaust section. A turbine engine can take on any number of different configurations. For example, a turbine engine can include one or more compressors and turbine, single or multiple spools, ducted or unducted fans, geared architectures, etc. In some examples, the fan and a low pressure compressor are on the same shaft as a low pressure turbine and a high pressure compressor is on the same shaft as a high pressure turbine.

In operation, rotating blades of the fan pull atmospheric air into the turbine engine and impel the air downstream. At least a portion of the air enters the core, where the air is compressed by rotating blades of a compressor, combined with fuel and ignited to generate a flow of a high-temperature, high-pressure gas (e.g., hot combustion gas), and fed to the turbine section. The hot combustion gases expand as they flow through the turbine section, causing rotating blades of the turbine(s) to spin and produce a shaft work output(s). For example, rotating blades of a high pressure turbine can produce a first shaft work output that is used to drive a first compressor, while rotating blades of a low pressure turbine can produce a second shaft work output that is used to drive a second compressor and/or the fan. In some examples, another portion of the air bypasses the core and, instead, is impelled downstream and out an exhaust of the turbine engine (e.g., producing a thrust).

Typically, a turbine engine includes one or more casings that surround components of the turbine engine and define a flow passage for airflow through the turbine engine. For example, the turbine engine can include a fan casing that surrounds rotor blades of the fan and one more core casings that surround rotor blades of the compressor section and/or the turbine section. A distance between a tip of a rotor blade (e.g., a rotating blade such as a fan blade, a compressor blade, etc.) and a respective casing(s) is referred to as a tip clearance. Typically, rotor blades are made using a material that is different than a material of a casing surrounding the rotor blades. A fan blade(s), for example, may be manufactured using a metal (e.g., titanium, aluminum, lithium, etc., and/or a combination thereof), whereas a casing surrounding the fan blade(s) can be made of a composite material. Thus, in some such examples, the fan blade(s) and the casing can expand at different rates based on different rates of thermal expansion of their respective materials.

In operation, the casing(s) and rotor blades experience a variety of loads that influence tip clearance, such as thermal loads, pressure loads, and/or mechanical loads. For example, during operation, metal rotor blades may contract in response to relatively low ambient temperatures (e.g., based on differential thermal expansion), while a composite case may not contract, resulting in tip clearance opening. Over a time period of engine operation, tip clearance can transition between a larger clearance and a smaller clearance due to rotor growth and casing growth (e.g., through rotational speed of a rotor, thermal expansion of the rotating components and the casing, etc.). These transitions can result in issues with tip clearance, which can negatively impact the operability and performance of the turbine engine. In some instances, tip clearance between a blade and a casing can be substantially non-existent. In such instances, the rotor blade can rub against the casing (e.g., referred to herein as blade tip rubbing), which can result in damage to the casing, the blade, and/or another component of the turbine engine.

Conversely, in some instances, increases in blade tip clearance can result in performance losses as the tip blade tip clearance grows. For example, a larger tip clearance can result in tip leakage flow. Tip leakage flow as disclosed herein refers to air flow losses in a region of the casing associated with a rotor blade tip (e.g., a tip region).

The flow field of air in the tip region (e.g., fan blade tip region, compressor blade tip region, etc.) is relatively complex due to generation of vortical structures by interaction of the axial flow with the rotor blades and a surface (e.g., of the casing) near the rotor blade tips. In the fan, for example, as tip clearance between a fan blade and a fan case increase, several vortices in the tip region are generated (e.g., tip leakage, separation and induced vortices). These interactions can lead to aerodynamic loss in the fan and decreased efficiency of the turbine engine. Thus, performance of the fan is closely related to its tip leakage mass flow rate and level of tip and casing interactions. In the compressor section, interactions of tip leakage flow with the mainstream flow and other secondary flows can lead to decreased efficiency and negatively impact compressor stability. In some examples, tip flow leakage can result in compressor and/or fan instabilities such as stall and surge. Compressor and/or fan stall is a circumstance of abnormal airflow resulting from the aerodynamic stall of the rotor blades within the respective component, which causes the air flowing through the component to slow down or stagnate. Compressor and/or fan surge refers to a stall that results in the disruption (e.g., complete disruption, partial disruption, etc.) of the airflow through the respective component.

Based on the foregoing, at least one factor that determines performance of a turbine engine is tip clearance associated with a fan and/or a compressor. Typically, turbine engine performance increases with a smaller tip clearance to minimize or otherwise reduce air loss or leakage around the blade tip. If close tip clearances are not maintained, a loss of performance will be noticed in pressure capability and airflow. However, tip clearance that is too small (e.g., resulting in blade tip rubbing against the casing) can result in damage to the casing, the blade, and/or another component of the turbine engine. Thus, an ability to control (e.g., manage) tip clearance during operation of a turbine engine can be important for aerodynamic performance of a turbine engine.

Examples disclosed herein enable manufacturing of an example variable fan blade tip that provides for blade-tip-to-case clearance control. Example variable fan blade tips disclosed herein include a fan blade body and at least one blade tip insert near the tip section of the fan blade that expand and/or contract based on operating conditions. The variable fan blade tip can be used to control blade-tip-to-case clearance passively through the utilization of differing materials consisting of mechanical properties that provide controlled blade tip deformation based on the operating conditions. Controlled tip clearance between a rotor blade and a casing can be a challenge due to differential thermal expansion of the rotor blade(s) material and casing material. Certain examples herein provide a variable fan blade tip with passive clearance control that can be used for different fan blade locations.

FIG. 1 is a schematic cross-sectional view of an example high-bypass turbofan-type gas turbine engine 100. While the illustrated example is a high-bypass turbofan engine, the principles of the present disclosure are also applicable to other types of engines, such as low-bypass turbofans, turbojets, turboprops, etc. As shown in FIG. 1, the turbine engine 100 defines a longitudinal or axial centerline axis 102 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 102, the radial direction R is a direction that extends orthogonally outwardly from the centerline axis 102, and the circumferential direction C is a direction that extends concentrically around the centerline axis 102.

In general, the turbine engine 100 includes a core turbine 104 disposed downstream from a fan (e.g., fan section) 106. The core turbine 104 includes a substantially tubular outer casing 108 that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 can also couple to a fan spool or shaft 128 of the fan 106. In some examples, the LP shaft 126 is coupled directly to the fan shaft 128 (e.g., a direct-drive configuration). In alternative configurations, the LP shaft 126 can couple to the fan shaft 128 via a reduction gear 130 (e.g., an indirect-drive or geared-drive configuration).

As shown in FIG. 1, the fan 106 includes a plurality of fan blades 132 coupled to and extending radially outwardly from the fan shaft 128. An annular fan casing or nacelle 134 circumferentially encloses the fan 106 and/or at least a portion of the core turbine 104. The nacelle 134 can be supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbine engine 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where the air 158 mixes with fuel and burns to provide combustion gases 160.

The combustion gases 160 flow through the HP turbine 118 where one or more sequential stages of HP turbine stator vanes 162 and HP turbine rotor blades 164 coupled to the HP shaft 124 extract a first portion of kinetic and/or thermal energy therefrom. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof. A turbine frame 170 with a fairing assembly is located between the HP turbine 118 and the LP turbine 120. The turbine frame 170 acts as a supporting structure, connecting a high-pressure shaft's rear bearing with the turbine housing and forming an aerodynamic transition duct between the HP turbine 118 and the LP turbine 120. Fairings form a flow path between the high-pressure and low-pressure turbines and can be formed using metallic castings (e.g., nickel-based cast metallic alloys, etc.).

Along with the turbine engine 100, the core turbine 104 serves a similar purpose and is exposed to a similar environment in land-based gas turbines, turbojet engines in which the ratio of the first portion 146 of the air 142 to the second portion 148 of the air 142 is less than that of a turbofan, and unducted fan engines in which the fan 106 is devoid of the nacelle 134. In each of the turbofan, turbojet, and unducted engines, a speed reduction device (e.g., the reduction gear 130) can be included between any shafts and spools. For example, the reduction gear 130 is disposed between the LP shaft 126 and the fan shaft 128 of the fan 106.

As described above with respect to FIG. 1, the turbine frame 170 is located between the HP turbine 118 and the LP turbine 120 to connect the high-pressure shaft's rear bearing with the turbine housing and form an aerodynamic transition duct between the HP turbine 118 and the LP turbine 120. As such, air flows through the turbine frame 170 between the HP turbine 118 and the LP turbine 120.

Figure 2:
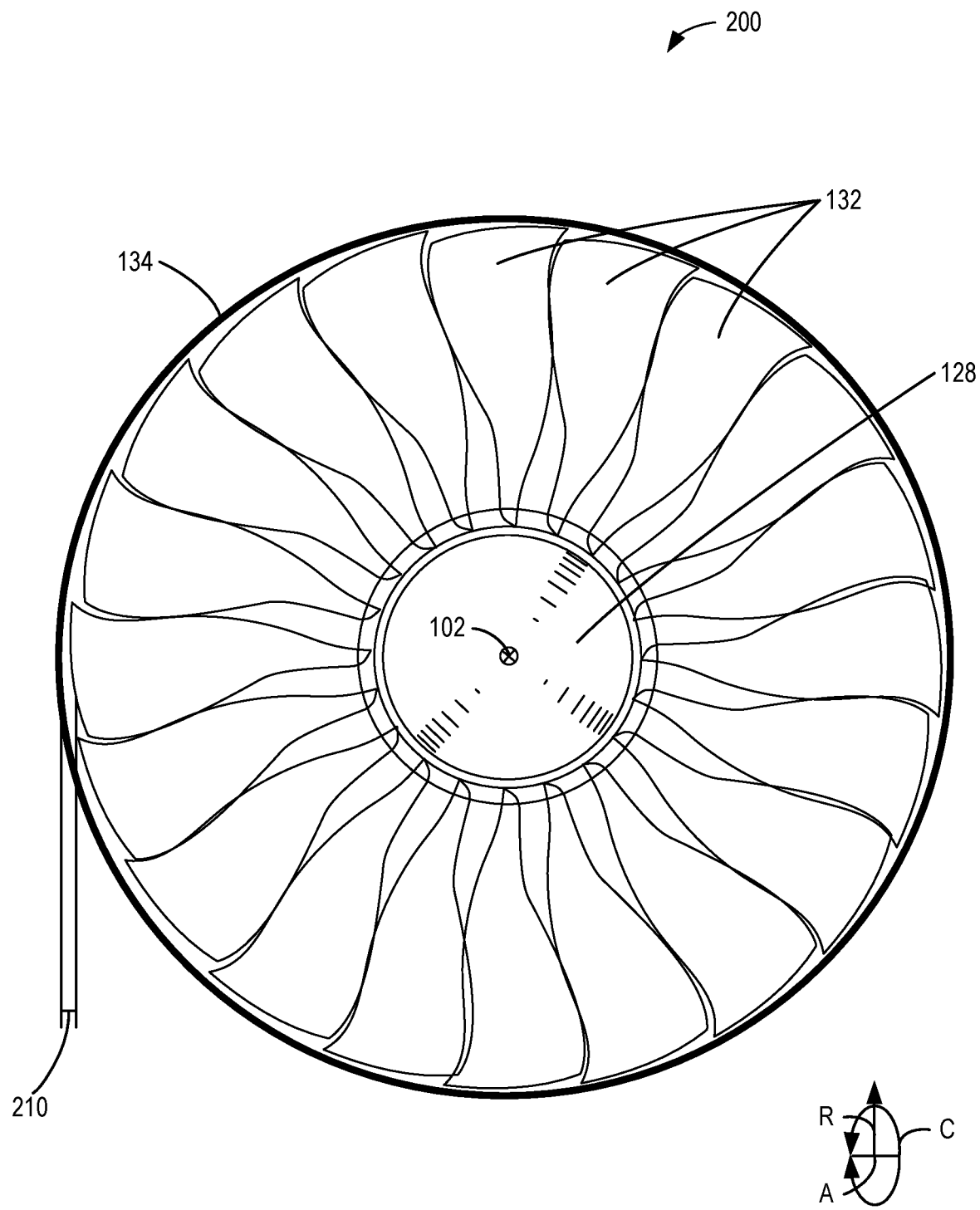
FIG. 2 is a forward view of the example gas turbine engine of FIG. 1 in which examples disclosed herein may be implemented.

FIG. 2 is a forward view of the example turbine engine 100 of FIG. 1. The turbine engine forward view 200 includes the centerline axis 102, the fan spool or shaft 128, the plurality of fan blades 132, and the nacelle 134 of FIG. 1, and further includes an example blade tip clearance 210. The example blade tip clearance 210 indicates a radial distance (along the radial direction R) between the tips of the plurality of fan blades 132 and the nacelle 134. As mentioned above, the ability to control the blade tip clearance is desired to reduce the risk of damage to the blade and/or the casing while also increasing performance.

Figure 3:
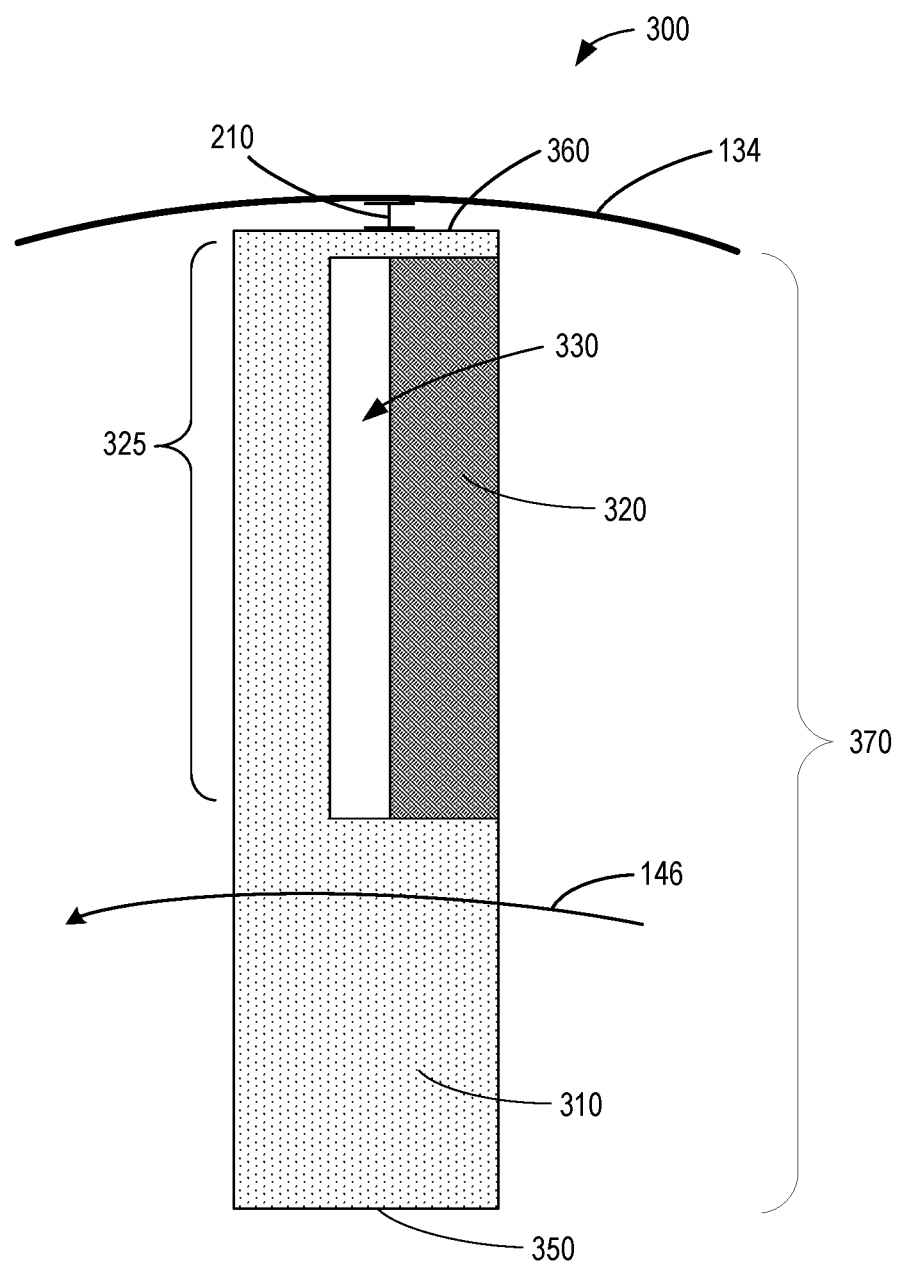
FIG. 3 is through-thickness view of an example fan blade for the example gas turbine engine of FIG. 1.

FIG. 3 is a through thickness view of an example fan blade for the example turbine engine 100 of FIG. 1. The first example fan blade 300 includes a blade body 310 and a first insert 320 that is inserted into a first blade tip region 325. In some examples, the blade body 310 is manufactured to include an opening 330 near the tip of the blade. In some examples, the first example fan blade 300 may be taken from an existing turbine engine 100 and retrofitted to include the opening 330. In such an example, the first example fan blade 300 can be modified (e.g., through a boring process, machining process, etc.) to remove a portion of the first example fan blade 300 to create the opening 330 and allow insertion of the first insert 320. The opening 330 (which can be a notch or groove) is sized so as to allow the first insert 320 to be placed inside the opening 330. In some examples, the first portion 146 of the air 142 flows across the first example fan blade 300, where the first insert 320 is on the suction side of the air flow (e.g., upstream).

In some examples, the first insert 320 may be made of a material with a high coefficient of thermal expansion (CTE), such as a silicon-based polymer or rubber. A high CTE is greater than or equal to $450.0 \times 10^{-6}$ per degrees Fahrenheit, for example, indicating an amount of deformation in relation to a change in temperature of the component. In such an example, as operating conditions within the turbine engine 100 result in an increase in temperature, the first insert 320 may expand to decrease the blade tip clearance 210 by increasing the length of the first blade tip region 325. Likewise, with a decrease in operating temperature, the first insert 320 may reduce the blade tip clearance 210 by decreasing the length of the first blade tip region 325. In some examples, the first blade tip region 325 can be sized up to 20% of a total length 370 (e.g., a distance from a root 350 to a tip 360 of a fan blade such as the first example fan blade 300) of the first example fan blade 300, which can result in more than 10 mils of clearance control given a temperature difference of around 100 degrees Fahrenheit (e.g., the difference between take-off flight conditions and cruise flight conditions).

While the examples described herein refer to the first insert 320 as a silicon-based polymer or rubber material, any other material may be used that has a CTE value higher than that of the blade body 310. In some examples, the blade body 310 may be manufactured out of aluminum, which has a CTE of $13.0 \times 10^{-6}$ per degrees Fahrenheit. In such an example, any material exhibiting a CTE greater than that of Aluminum may be used to achieve the passive fan blade tip clearance control describer herein, such as a nickel-based alloy (e.g., ILLIUM® which has a CTE of $26.7 \times 10^{-6}$ per degrees Fahrenheit), a synthetic resin (e.g., polypropylene which has a CTE of $50.0 \times 10^{-6}$ per degrees Fahrenheit), etc.

It may be desirable to manufacture the first example fan blade 300 with a minimum blade tip clearance (e.g., as close to zero clearance as manufacturing tolerances allow) rather than manufacturing for the one region of flight with the highest operating temperature (such as takeoff, which can be anywhere from 2,500° F. to 3,100° F.). Using the first example fan blade 300 (or the subsequent example fan blades 400 and 500 described below) enables the ability to modify the manufacturing process to reduce compromises related to manufacturing for one region of flight.

Figure 4:
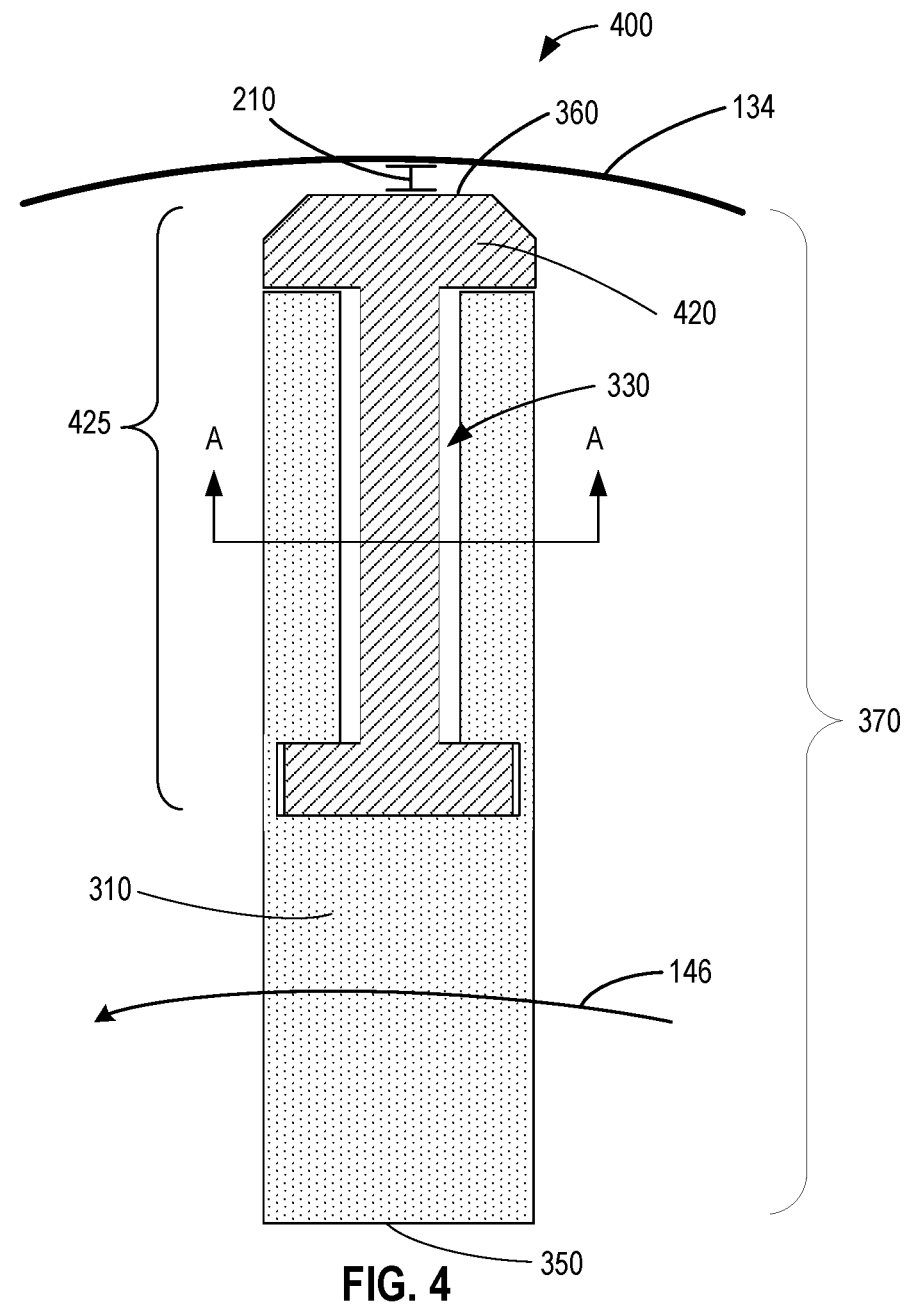
FIG. 4 is through-thickness view of an alternative example fan blade for the example gas turbine engine of FIG. 1.

FIG. 4 is a through thickness view of another example fan blade for the example turbine engine 100 of FIG. 1. The second example fan blade 400 includes the blade body 310 and a second insert 420 that is inserted into a second blade tip region 425 inside the opening 330. In some examples, the blade body 310 is manufactured such that the second insert 420 may be inserted into the second blade tip region 425. In some examples, the second example fan blade 400 may be taken from an existing turbine engine 100 and retrofitted to include the opening 330. In such an example, the second example fan blade 400 can be modified (e.g., through a boring process, machining process, etc.) to remove a portion of the second example fan blade 400 to create the opening 330 and allow insertion of the second insert 420. In some examples, the first portion 146 of the air 142 flows across the second example fan blade 400, where the second insert 420 is equally surrounded on both sides (e.g., the suction side and the compression side) by the blade body 310.

In some examples, the second insert 420 may be made of a material with an inverse coefficient of thermal expansion (CTE), such as an iron-manganese-gallium (Fe—Mn—Ga) shape memory alloy (SMA). A suitable inverse CTE is less than or equal to $-27.0 \times 10^{-6}$ per degrees Fahrenheit, for example, indicating an amount of deformation in relation to a change in temperature of the component. In such an example, as operating conditions within the turbine engine 100 result in an increase in temperature, the second insert 420 contracts to increase the blade tip clearance 210 by decreasing the length of the second blade tip region 425. Likewise, as operating temperature decreases, the second insert 420 expands to decrease the blade tip clearance 210 by increasing the length of the second blade tip region 425. In some examples, the second blade tip region 425 can be sized up to 25% of the total length 370 (e.g., the distance from the root 350 to the tip 360 of the fan blade such as the second example fan blade 400) of the second example fan blade 400, which can result in more than 10 mils of clearance control given a temperature difference of around 100 degrees Fahrenheit (e.g., the difference between take-off flight conditions and cruise flight conditions).

While the examples described herein refer to the second insert 420 as a Fe—Mn—Ga SMA, any other material may be used that has an inverse CTE value. Examples of such materials include titanium alloys, such as ALLVAR Alloy 30 which has a CTE of $-16.7 \times 10^{-6}$ per degrees Fahrenheit, nickel-titanium alloys, such as NiTi SMA which has a CTE of $-6.1 \times 10^{-6}$ per degrees Fahrenheit, or any other material exhibiting a negative CTE.

Figure 5:
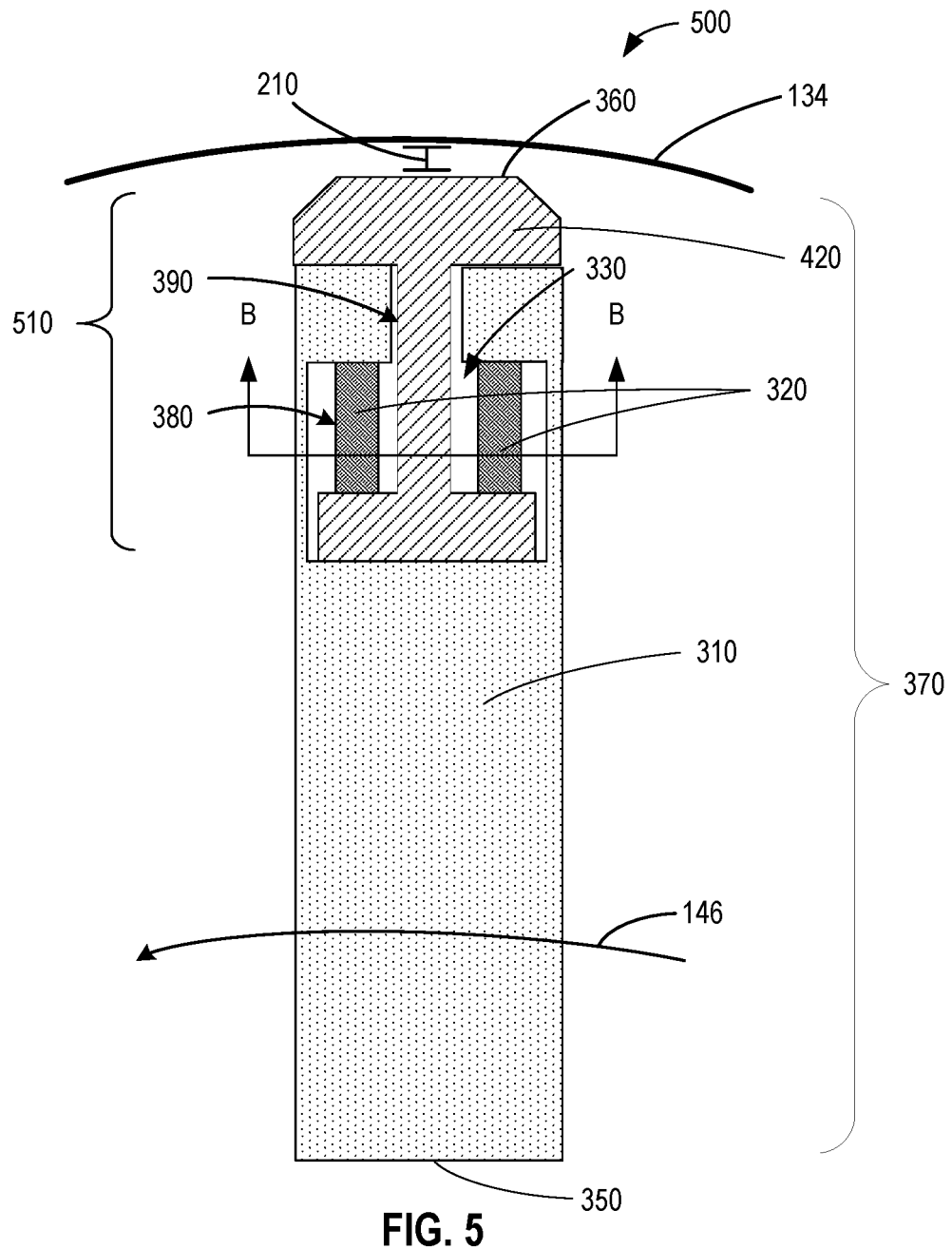
FIG. 5 is through-thickness view of another alternative example fan blade for the example gas turbine engine of FIG. 1.

FIG. 5 is a through thickness view of another example fan blade for the example turbine engine 100 of FIG. 1. The third example fan blade 500 includes the fan blade body 310, the first insert 320, and the second insert 420, the first insert 320 and second insert 420 inserted into a third blade tip region 510 inside the opening 330. The third example fan blade 500 utilizes the first insert 320 of the first example fan blade 300 and the second insert 420 of the second example fan blade 400 and the first insert 320 and the second insert 420 are combined into the third blade tip region 510. In some examples, the fan blade body 310 is manufactured such that the first insert 320 and the second insert 420 can be placed inside the third blade tip region 510. In some examples, the third example fan blade 500 may be taken from an existing turbine engine 100 and retrofitted to include the opening 330. In such an example, the third example fan blade 500 can be modified (e.g., through a boring process, machining process, etc.) to remove a portion of the third example fan blade 500 to create the opening 330 and allow insertion of the first and second insert 320, 420. In some examples, the first portion 146 of the air 142 flows across the third example fan blade 500, where the combination of the first insert 320 and the second insert is equally surrounded on both sides (e.g., the suction side and the compression side) by the blade body 310. In some examples, the third blade tip region includes a first insert section 380 and a second insert section 390, where the first insert section 380 houses the first insert 320 and the second insert section 390 houses the second insert 420. In the examples described herein, the first and second insert sections 380, 390 may be sized as appropriate to accommodate the first and second inserts 320, 420.

In some examples, the first insert 320 may be made of a material with a high coefficient of thermal expansion (CTE), such as a silicon based polymer or rubber. In some examples, a high CTE, as mentioned above, is greater than or equal to $450.0 \times 10^{-6}$ per degrees Fahrenheit. In some examples, the second insert 420 may be made of a material with an inverse coefficient of thermal expansion (CTE), such as a Fe—Mn—Ga shape memory alloy (SMA). In some examples, a suitable inverse CTE, as mentioned above, is less than or equal to $-27.0 \times 10^{-6}$ per degrees Fahrenheit. In some examples, where the first insert 320 includes a high CTE material and the second insert 420 includes an inverse CTE material, the third blade tip region 510 can be sized up to 25% of the total length 370 (e.g., the distance from the root 350 to the tip 360 of the fan blade such as the third example fan blade 500) of the third example fan blade 500, which can result in more than 50 mils of clearance control given a temperature difference of around 100 degrees Fahrenheit (e.g., the difference between take-off flight conditions and cruise flight conditions). In this example, the amount of control over the blade tip clearance 210 is improved due to the combination of the high CTE and inverse CTE properties of the first insert 320 and the second insert 420.

In some examples, more than one of the first insert 320 can be used in the third example fan blade 500. In such an example, the control over the blade tip clearance 210 can be improved because a plurality of inserts magnify the ability to increase and/or decrease the blade tip clearance 210.

In some examples, through the modification of the material used in the first insert 320 and/or the second insert 420, the blade tip clearance 210 can vary throughout all phases of flight of the example gas turbine engine 100 as the insert(s) 320 and/or 420 continually adjust to operating conditions. As such, the plurality of fan blades 132 need not be designed and manufactured to accommodate just one portion of flight. In most cases, the plurality of fan blades 132 are manufactured for the takeoff portion of flight since ambient temperature is the highest and the operating conditions are the most extreme. Therefore, the examples provided herein, either in isolation or in combination, may reduce or alleviate the need to compromise on performance when designing and manufacturing fan blades.

Figure 6:
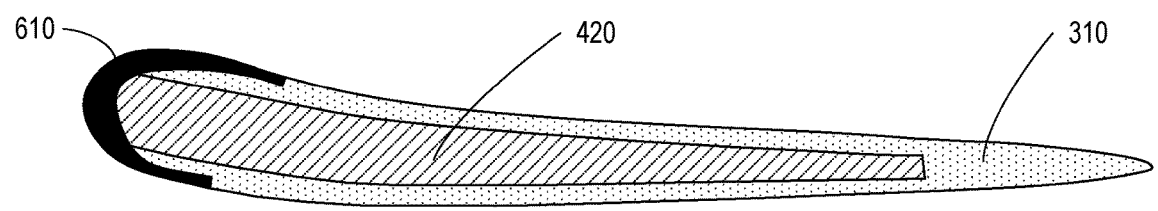
FIG. 6 is a cross-sectional view of the alternative example fan blade of FIG. 4 taken along the A-A line as shown in FIG. 4.

FIG. 6 is a cross-sectional view (or airfoil view) of the second example fan blade 400 taken along the A-A line as shown in FIG. 4. As illustrated in FIG. 6, the airfoil view of the second example fan blade 400 includes the fan blade body 310, the second insert 420, and a leading edge 610. In some examples, the leading edge 610 can be made of metal, carbon fiber, or any other suitable material for the leading edge of a fan blade. The second insert 420 is placed within the blade body 310 (e.g., encased within the outside boundary of the second example fan blade 300 where air flows over the surface), and, thus, does not disrupt the flow of air across the second example fan blade 400 since the skin of the airfoil (e.g., the outside surface of the second example fan blade 400 where the air 142 flows over) remains the same regardless of the inclusion of the second blade tip insert 420.

Figure 7:
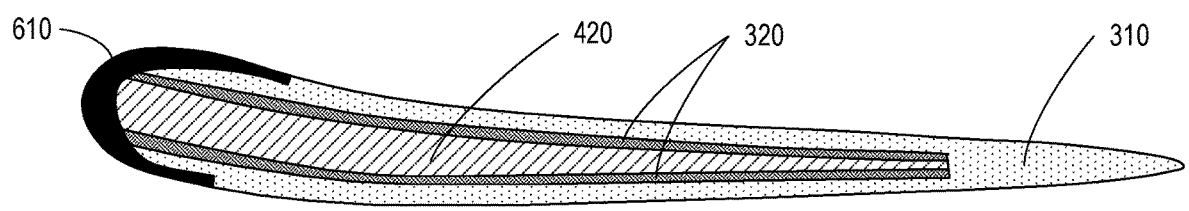
FIG. 7 is a cross-sectional view of the alternative example fan blade of FIG. 5 taken along the B-B line as shown in FIG. 5.

FIG. 7 is a cross-sectional view (or airfoil view) of the third example fan blade 500 taken along the B-B line as shown in FIG. 5. As illustrated in FIG. 7, the airfoil view of the third example fan blade 500 includes the fan blade body 310, the first insert 320, the second insert 420, and the leading edge 610. The first insert 320 and the second insert 420 are placed within the blade body 310, and, thus, do not disrupt the flow of air across the third example fan blade 500 since the skin of the airfoil (e.g., the outside surface of the third example fan blade 500 where the air 142 flows over) remains the same regardless of the inclusion of the first blade tip insert 320 and/or the second blade tip insert 420.

Figure 8:
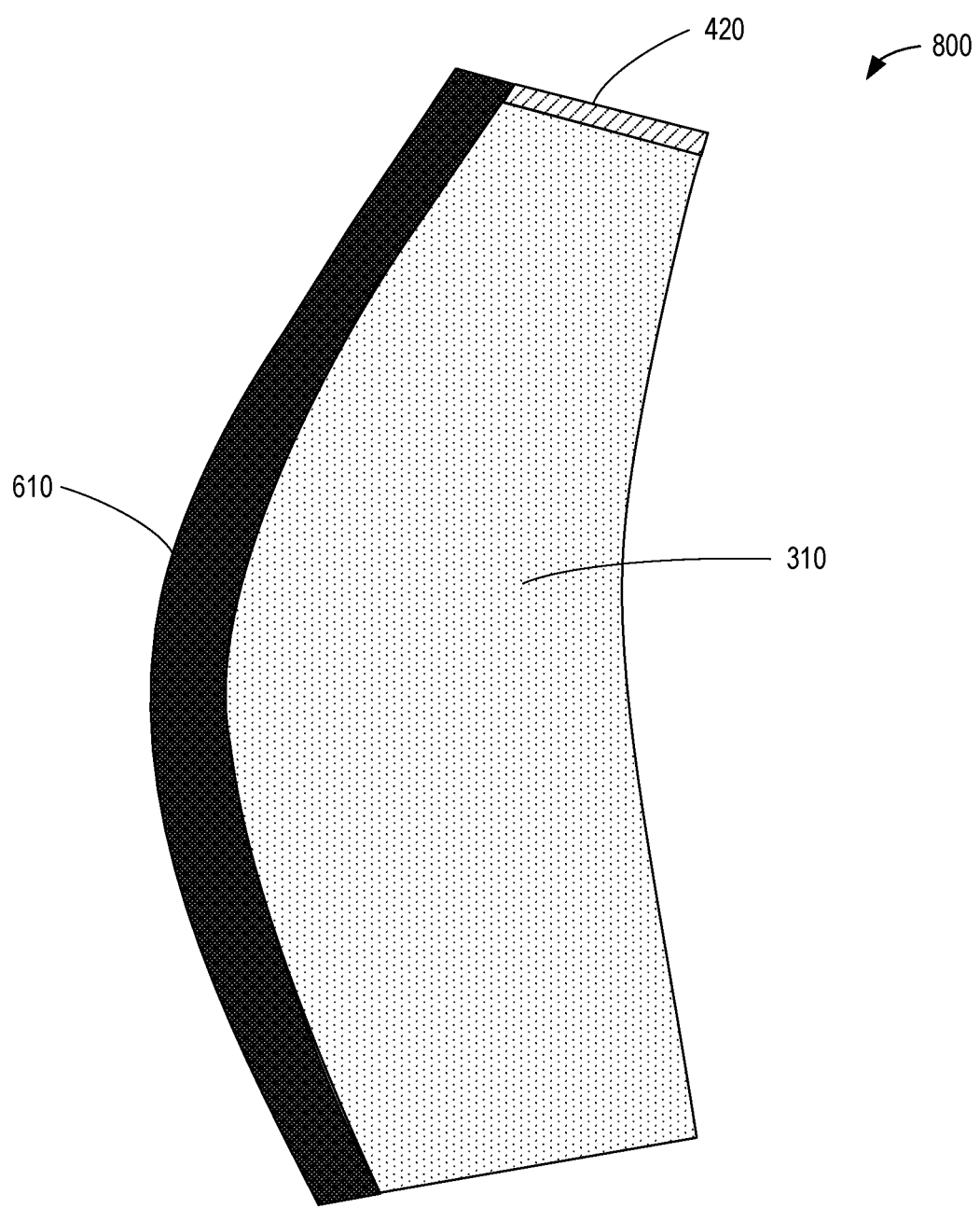
FIG. 8 is a top-down view of the alternative example fan blades of FIGS. 4 and/or 5.

FIG. 8 is a top-down view of the example fan blades of FIGS. 4 and/or 5. The example top-down view 800 illustrates an orientation of the blade body 310, the leading edge 610, and the inclusion of at least the second insert 420. In some examples, the example top-down view 800 includes the first insert 320. Such an example is not illustrated in FIG. 8 since the entirety of the first insert 320 is covered by the fan blade body 310 (see FIG. 5).

Figure 9:
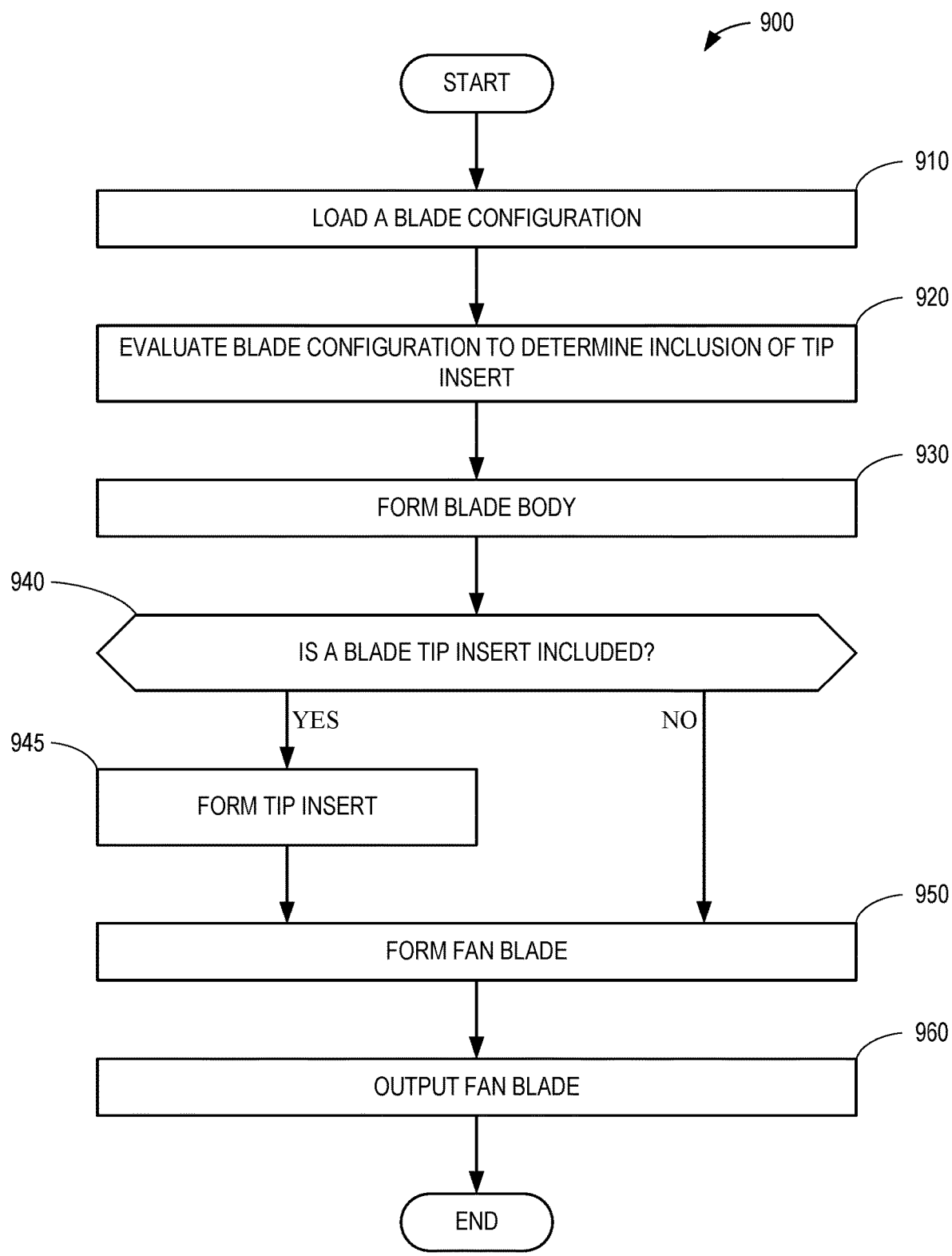
FIG. 9 is a flowchart representative of an example fan blade manufacturing process for the example fan blades of FIGS. 3, 4, and/or 5.

FIG. 9 is a flowchart representative of an example fan blade manufacturing process for the fan blades of FIGS. 3, 4, and/or 5. The example fan blade manufacturing process 900 begins at block 910, at which a blade configuration is loaded. A blade configuration may include the location in the turbine engine 100 at which the fan blade (e.g., one of the plurality of fan blades 132) is to be placed (e.g., high pressure, low pressure, etc.), the operating conditions that the fan blade 132 is to experience (e.g., the range of temperatures the blade will experience during takeoff and cruise), etc.

The example fan blade manufacturing process 900 then evaluates the blade configuration of block 910 to determine if a blade tip insert (e.g., the first insert 320 and/or the second insert 420) is desired. (Block 920). In some examples, the example fan blade manufacturing process 900 determines whether a blade tip insert (e.g., the first blade tip insert 320 and/or the second blade tip insert 420) is desired by analyzing the configuration loaded at block 910 and uses the information in the configuration to determine inclusion of the blade tip insert. In some examples, the example fan blade manufacturing process 900 at block 920 includes a pre-determined outcome (e.g., a pre-loaded simulation) to output whether the blade tip insert is desired based on the location in the turbine engine 100 the fan blade 132 is to be placed. In some examples, the manufacturing of the fan blade 132 may be modified to accommodate the inclusion of the blade tip insert desired. In such an example, the determination of whether to include the blade tip insert is performed prior to the manufacturing of the fan blade 132. In other examples, the inclusion of the blade tip insert is not desired. In such an example, the manufacturing of the fan blade 132 is performed such that no consideration of a blade tip insert is desired (e.g., the opening 330 is not included in the blade body 310).

The example fan blade manufacturing process 900 then forms the blade body 310 to be used on the fan blade 132. (Block 930). The blade body 310 is the foundational structure to the fan blade 132 itself and may be formed using known methods in the art to manufacture a fan blade 132 (e.g., standard forging techniques, additive manufacturing, etc.). In some examples, the blade body 310 may vary based on evaluation of the inclusion of the blade tip insert of block 920 from the blade configuration of block 910. Such variations can include manufacturing the blade body 310 to include the opening 330. In other examples, the fan blade 132 can be taken from an existing turbine engine 100 and retrofitted to include the blade tip insert. In such an example, the fan blade 132 can be modified (e.g., through a boring process, machining process, etc.) to remove a portion of the fan blade 132 to create the opening 330 and allow insertion of the blade tip insert.

The example fan blade manufacturing process 900 then evaluates the determination of block 920 for inclusion of the blade tip insert. (Block 940). If the example fan blade manufacturing process 900 determines that the inclusion of the blade tip insert is desired (e.g., block 940 returns a result of YES), then the blade tip insert is formed. (Block 945). In some examples, the blade tip formation of block 945 may be a separate process from the formation/manufacturing process of the fan blade body 310 to allow for a different formation/manufacturing process. Although the blade tip formation of block 945 may be a separate process, the same operator (e.g., a computer, a machine operator, etc.) that performed the formation of the blade body 310 can perform the formation of the blade tip insert. In some examples, the determination of block 920 can indicate that a combination of the properties from the first insert 320 and the second insert 420 is desired for the fan blade 132. In such an example, the blade tip is manufactured using the properties of the first insert 320, which includes the high CTE (greater than or equal to $450.0 \times 10^{-6}$ per degrees Fahrenheit), and the properties of the second insert 420, which includes the inverse CTE (less than or equal to $-27.0 \times 10^{-6}$ per degrees Fahrenheit).

When the example fan blade manufacturing process 900 determines that no blade tip insert is desired (e.g., block 940 returns a result of NO) or when the formation of the blade tip insert from block 945 is completed, the final fan blade (e.g., the first example fan blade 300, the second example fan blade 400, the third example fan blade 500, or a fan blade without the blade tip insert) is then formed. (Block 950). In some examples, where the inclusion of the blade tip insert is desired, the blade tip insert and the blade body 310 are combined to form the final fan blade (e.g., the first example fan blade 300, the second example fan blade 400, the third example fan blade 500). In some examples, the blade body 310 may be modified (e.g., through a machining process to bore the blade body 310 to create the opening 330) to allow for the inclusion of the blade tip insert. In other examples, the blade body 310 already includes the opening 330 to insert the blade tip insert. In some examples, where the inclusion of the blade tip insert is not desired, the blade tip insert is not included in the configuration.

When the final fan blade 300, 400, 500, etc. is formed, the example fan blade manufacturing process 900 then outputs the final fan blade 300, 400, 500, etc. for use. (Block 960). In some examples, the outputting of the final fan blade 300, 400, 500, etc. from block 960 may include additional steps that transform the formation of the final fan blade 300, 400, 500, etc. from block 950 into a component that may then be installed onto an engine application such as polishing, sanding, heat treatment, etc. In some examples, the output of block 960 may include just outputting the final fan blade 300, 400, 500, etc. formed from block 950.

While an example manner of implementing the example fan blade manufacturing process 900 is illustrated in FIG. 9, one or more of the elements, processes, and/or devices illustrated in FIG. 9 may be combined, divided, re-arranged, omitted, eliminated, and/or implemented in any other way. Further, the example fan blade manufacturing process 900 of FIG. 9 may include one or more elements, processes, and/or devices in addition to, or instead of, those illustrated in FIG. 9, and/or may include more than one of any or all of the illustrated elements, processes, and devices.

In some examples, the example turbine engine 100 of the illustrated example of FIG. 1 includes means for passively adjusting the blade tip clearance 210 between the plurality of fan blades 132 and the fan casing or nacelle 134. In some examples, the means for passively adjusting the blade tip clearance 210 are implemented by the first blade tip insert 320 and/or the second blade tip insert 420.

Figure 10:
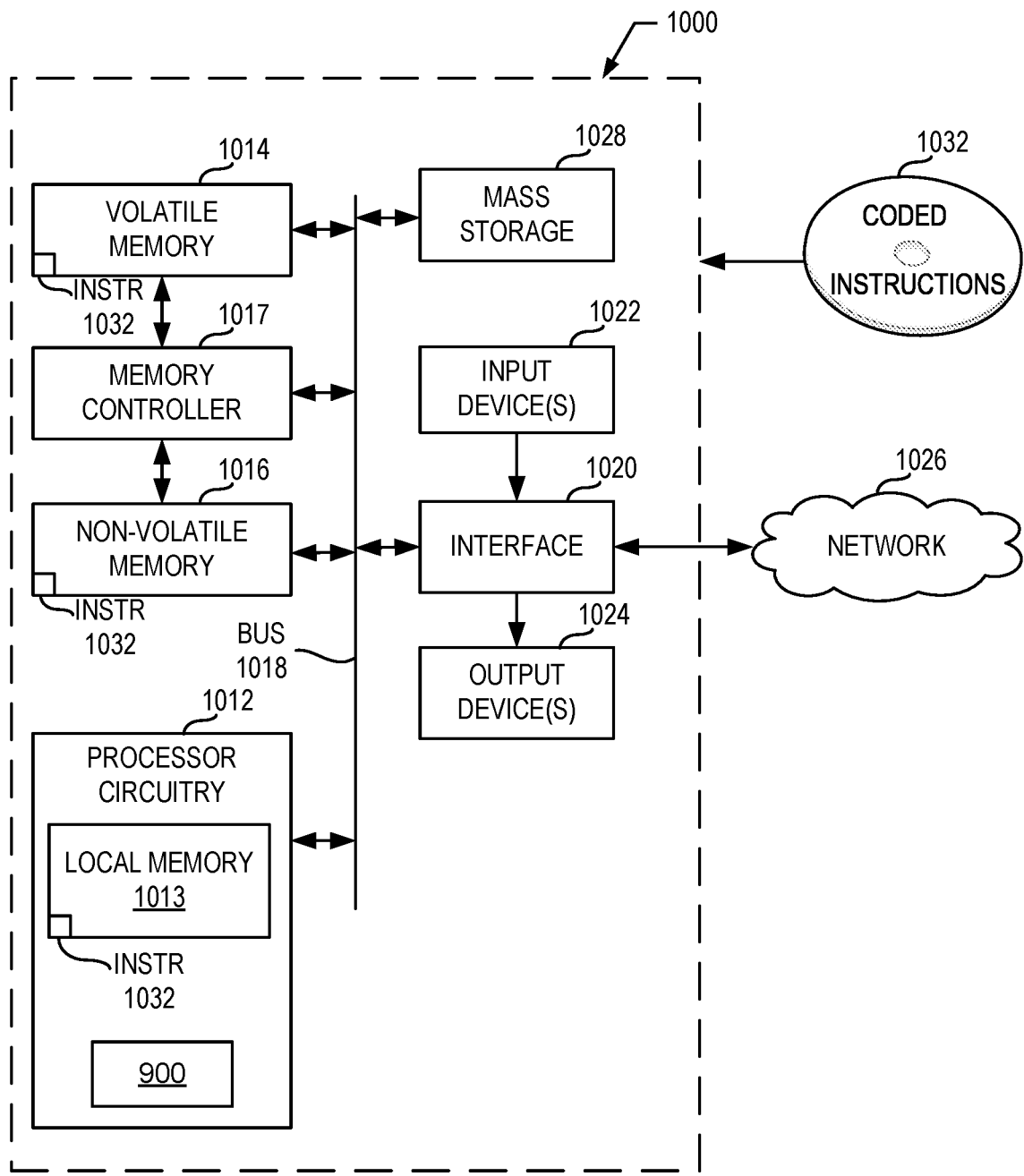
FIG. 10 is a block diagram of an example processing platform including processor circuitry structured to execute the example machine readable instructions and/or the example operations of FIG. 9 to manufacture the example fan blades of FIGS. 3, 4, and/or 5.

FIG. 10 is a block diagram of an example processor platform 1000 structured to execute and/or instantiate the machine readable instructions and/or the operations of FIG. 9 to implement the example fan blade manufacturing process 900 of FIG. 9. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry

1012 may be implemented by one or more semiconductor based (e.g., silicon based) devices. In this example, the processor circuitry 1012 implements example fan blade manufacturing process 900 of FIG. 9.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, a keyboard, a button, a mouse, a touchscreen, a track-pad, a trackball, and/or an isopoint device.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.) or a manufacturing apparatus such as a forging device. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIG. 9, may be stored in the mass storage device 1028, in the volatile memory 1014, in the non-volatile memory 1016, and/or on a removable non-transitory computer readable storage medium such as a CD or DVD.

From the foregoing, it will be appreciated that example systems, methods, apparatus, and articles of manufacture have been disclosed that allows for passive fan blade tip clearance control. Passive fan blade tip clearance control allows for the fan blade to adjust based on operating conditions to reduce the amount of tip clearance between the fan blades and the casing, increasing performance while reducing the risk for damage to the fan blades and/or casing.

Example methods, apparatus, systems, and articles of manufacture for passive fan blade tip clearance control are disclosed herein. Further examples and combinations thereof include the following:

Example 1 includes a fan blade for a gas turbine engine, the fan blade comprising a fan blade body including a tip region at a blade tip of the fan blade body and a blade tip insert disposed within the tip region of the fan blade body, the blade tip insert is formed from a material that passively adjusts a shape of the blade tip insert to maintain a blade tip clearance between the blade tip and an engine casing or nacelle by at least one of expanding or contracting based on temperature.

Example 2 includes the fan blade of any preceding clause, wherein the tip region is included in the fan blade body when the fan blade body is manufactured.

Example 3 includes the fan blade of any preceding clause, wherein the tip region is retrofitted to the fan blade body after the fan blade body is manufactured.

Example 4 includes the fan blade of any preceding clause, wherein the blade tip insert is made of a silicon based polymer or rubber.

Example 5 includes the fan blade of any preceding clause, the fan blade having a length extending radially from a centerline of the gas turbine engine, wherein the tip region is sized up to 20% of the length Example 6 includes the fan blade of any preceding clause, wherein the blade tip insert is made of an iron-manganese-gallium shape memory alloy.

Example 7 includes the fan blade of any preceding clause, the fan blade having a length extending radially from a centerline of the gas turbine engine, wherein the tip region is sized up to 20% of the length.

Example 8 includes the fan blade of any preceding clause, wherein the blade tip insert includes a first insert section and a second insert section.

Example 9 includes the fan blade of any preceding clause, wherein the first insert section is made of a silicon based polymer or rubber and the second insert section is made of an iron-manganese-gallium shape memory alloy.

Example 10 includes the fan blade of any preceding clause, the fan blade having a length extending radially from a centerline of the gas turbine engine, wherein the tip region is sized up to 25% of the length.

Example 11 includes a turbine engine having a centerline axis, the turbine engine comprising a fan casing or nacelle, a plurality of fan blades, the fan casing or nacelle surrounding the plurality of fan blades, each of the plurality of fan blades including a tip region at a blade tip of a fan blade body of the respective fan blade and a blade tip insert disposed in the tip region, the blade tip insert to passively adjust a blade tip clearance between the fan casing or nacelle and the blade tip of the respective fan blade by at least one of expanding or contracting based on temperature, and a fan shaft extending in-line with the centerline axis, the plurality of fan blades coupled to and extending radially outwardly from the fan shaft.

Example 12 includes the turbine engine of any preceding clause, wherein the tip region is included in the plurality of fan blades when the plurality of fan blades are manufactured.

Example 13 includes the turbine engine of any preceding clause, wherein the tip region retrofitted to the plurality of fan blades after the plurality of fan blades are manufactured.

Example 14 includes the turbine engine of any preceding clause, wherein the blade tip insert is made of a silicon based polymer or rubber.

Example 15 includes the turbine engine of any preceding clause, further including a length extending radially from the centerline of the turbine engine, wherein the tip region is sized up to 20% of the length.

Example 16 includes the turbine engine of any preceding clause, wherein the blade tip insert is made of an iron-manganese-gallium shape memory alloy.

Example 17 includes the turbine engine of any preceding clause, further including a length extending radially from the centerline of the turbine engine, wherein the tip region is sized up to 25% of the length.

Example 18 includes the turbine engine of any preceding clause, wherein the plurality of fan blades includes a first blade tip insert section and a second blade tip insert section.

Example 19 includes the turbine engine of any preceding clause, wherein the first blade tip insert section is made of a silicon based polymer or rubber and the second blade tip insert section is made of an iron-manganese-gallium shape memory alloy.

Example 20 includes the turbine engine of any preceding clause, further including a length extending radially from the centerline of the turbine engine, wherein the tip region is sized up to 25% of the length.

Example 21 includes a fan blade for a gas turbine engine, the fan blade comprising, a fan blade body, the fan blade body including a tip region at a blade tip of the fan blade body, wherein the fan blade body is retrofittable with a blade tip insert in the tip region, shape of the blade tip insert passively adjusts to maintain a blade tip clearance between the blade tip and an engine casing or nacelle by at least one of expanding or contracting based on temperature.

Example 22 includes the fan blade of any preceding clause, wherein the fan blade body is retrofitted with the blade tip insert by cutting the tip region out of the fan blade body.

Example 23 includes the fan blade of any preceding clause, wherein the blade tip insert is made of a silicon based polymer or rubber.

Example 24 includes the fan blade of any preceding clause, wherein the blade tip insert is made of an iron-manganese-gallium shape memory alloy.

Example 25 includes the fan blade of any preceding clause, wherein the blade tip insert includes a first insert section and a second insert section.

Example 26 includes the fan blade of any preceding clause, wherein the first insert section is made of a silicon based polymer or rubber and the second insert section is made of an iron-manganese-gallium shape memory alloy.

Example 27 includes a method for forming a fan blade with a blade tip insert, the method comprising forming a fan blade body from a blade configuration, forming the blade tip insert based on the blade configuration, and forming the fan blade by combining the fan blade body with the blade tip insert.

Example 28 includes the method of any preceding clause, wherein forming the fan blade body further includes forming a tip region in the fan blade body for insertion of the blade tip insert Example 29 includes the method of any preceding clause, further including retrofitting the fan blade body with a tip region for insertion of the blade tip insert.

Example 30 includes the method of any preceding clause, wherein the blade configuration is based on operating temperature of the fan blade.

Example 31 includes the method of any preceding clause, wherein forming the blade tip insert includes selecting a material that increases a length of the blade tip insert with an increase in operating temperature and decreases the length of the blade tip insert with a decrease in operating temperature.

Example 32 includes the method of any preceding clause, wherein forming the blade tip insert includes selecting a material that decreases a length of the blade tip insert with an increase in operating temperature and increases the length of the blade tip insert with a decrease in operating temperature.

Example 33 includes the method of any preceding clause, wherein forming the blade tip insert further includes forming a first insert section and forming a second insert section.

Example 34 includes the method of any preceding clause, wherein forming the first insert section includes selecting a first material that increases a length of the first insert section with an increase in operating temperature and decreases the length of the first insert section with a decrease in operating temperature, and forming the second insert section includes selecting a second material that decreases a length of the second insert section with an increase in operating temperature and increases the length of the second insert section with a decrease in operating temperature.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A fan blade for a gas turbine engine, the fan blade comprising:
   a fan blade body including a tip region at a blade tip of the fan blade body, the fan blade body defining an opening located between a first portion of the tip region and a second portion of the tip region; and
   a blade tip insert disposed within the tip region of the fan blade body, the blade tip insert disposed in the opening, the blade tip insert is formed from a material that passively adjusts a shape of the blade tip insert to maintain a blade tip clearance between the blade tip and an engine casing or nacelle by at least one of expanding or contracting based on temperature, the material including at least one of a silicon based polymer, a rubber, or an iron-manganese-gallium shape memory alloy.

2. The fan blade of claim 1, the fan blade having a length extending radially from a centerline of the gas turbine engine, wherein the tip region is sized up to 20% of the length when the material is the silicon based polymer or the rubber.

3. The fan blade of claim 1, the fan blade having a length extending radially from a centerline of the gas turbine engine, wherein the tip region is sized up to 25% of the length when the material is the iron-manganese-gallium shape memory alloy.

4. The fan blade of claim 1, wherein the blade tip insert includes a first insert section and a second insert section.

5. The fan blade of claim 4, wherein the first insert section is made of the silicon based polymer or the rubber and the second insert section is made of the iron-manganese-gallium shape memory alloy.

6. The fan blade of claim 5, the fan blade having a length extending radially from a centerline of the gas turbine engine, wherein the tip region is sized up to 25% of the length.

7. A turbine engine having a centerline axis, the turbine engine comprising:
a fan casing or nacelle;
a plurality of fan blades, the fan casing or nacelle surrounding the plurality of fan blades, each of the plurality of fan blades including:
a tip region at a blade tip of a fan blade body of the respective fan blade, the fan blade body defining an opening located between a first portion of the tip region and a second portion of the tip region; and
a blade tip insert disposed in the tip region, the blade tip insert disposed in the opening, the blade tip insert composed of a material to passively adjust a blade tip clearance between the fan casing or nacelle and the blade tip of the respective fan blade by at least one of expanding or contracting based on temperature, the material including at least one of a silicon based polymer, a rubber, or an iron-manganese-gallium shape memory alloy; and
a fan shaft extending in-line with the centerline axis, the plurality of fan blades coupled to and extending radially outwardly from the fan shaft.

8. The turbine engine of claim 7, wherein the plurality of fan blades includes a first blade tip insert section and a second blade tip insert section.

9. The turbine engine of claim 8, wherein the first blade tip insert section is made of the silicon based polymer or the rubber and the second blade tip insert section is made of the iron-manganese-gallium shape memory alloy.

10. The turbine engine of claim 7, wherein respective fan blades of the plurality of fan blades have a length extending radially from the centerline axis, and wherein the tip region is sized up to 20% of the length when the material is the silicon based polymer.

11. The turbine engine of claim 7, wherein respective fan blades of the plurality of fan blades have a length extending radially from the centerline axis, and wherein the tip region is sized up to 25% of the length when the material is the iron-manganese-gallium shape memory alloy.

12. A fan blade for a gas turbine engine, the fan blade comprising:
a fan blade body including a tip region at a blade tip of the fan blade body; and
a blade tip insert disposed within the tip region of the fan blade body, the blade tip insert is formed from a material that passively adjusts a shape of the blade tip insert to maintain a blade tip clearance between the blade tip and an engine casing or nacelle by at least one of expanding or contracting based on temperature, the fan blade having a length extending radially from a centerline of the gas turbine engine, wherein the tip region is sized up to 20% of the length when the material is a silicon based polymer or a rubber.

13. The fan blade of claim 12, wherein the tip region is sized up to 25% of the length when the material is an iron-manganese-gallium shape memory alloy.

14. The fan blade of claim 12, wherein the blade tip insert includes a first insert section and a second insert section.

15. The fan blade of claim 14, wherein the first insert section is made of the silicon based polymer or the rubber and the second insert section is made of an iron-manganese-gallium shape memory alloy.

16. The fan blade of claim 15, wherein the tip region is sized up to 25% of the length.

17. A method for forming a fan blade with a blade tip insert, the method comprising:
forming a fan blade body from a blade configuration, the fan blade body including a tip region at a blade tip of the fan blade body, the fan blade body defining an opening located between a first portion of the tip region and a second portion of the tip region;
forming the blade tip insert based on the blade configuration, the blade tip insert formed from a material that passively adjusts a shape of the blade tip insert to maintain a blade tip clearance between the blade tip and an engine casing or nacelle by at least one of expanding or contracting based on temperature, the material including at least one of a silicon based polymer, a rubber, or an iron-manganese-gallium shape memory alloy; and
forming the fan blade by combining the fan blade body with the blade tip insert, the blade tip insert disposed in the opening located between the first portion of the tip region and the second portion of the tip region.

18. The method of claim 17, wherein the blade configuration is based on an operating temperature of the fan blade.

19. The method of claim 17, wherein the forming the blade tip insert includes:
selecting a material that increases a length of the blade tip insert with an increase in an operating temperature and decreases the length of the blade tip insert with a decrease in the operating temperature; or
selecting a material that decreases the length of the blade tip insert with the increase in the operating temperature and increases the length of the blade tip insert with the decrease in the operating temperature.

20. The method of claim 17, wherein forming the blade tip insert further includes:
forming a first insert section, wherein forming the first insert section includes selecting a first material that increases a length of the first insert section with an increase in an operating temperature and decreases the length of the first insert section with a decrease in the operating temperature; and
forming a second insert section, wherein forming the second insert section includes selecting a second material that decreases a length of the second insert section with the increase in the operating temperature and increases the length of the second insert section with the decrease in the operating temperature.

* * * * *